United States Patent
Choi et al.

(10) Patent No.: US 10,354,569 B2
(45) Date of Patent: Jul. 16, 2019

(54) MULTI-DISPLAY SYSTEM

(71) Applicant: Microsoft Technology Licensing, LLC, Redmond, WA (US)

(72) Inventors: Minhyuk Choi, Sammamish, WA (US); Ying Zheng, Sammamish, WA (US); Rajesh Dighde, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/427,754

(22) Filed: Feb. 8, 2017

(65) Prior Publication Data
US 2018/0226005 A1    Aug. 9, 2018

(51) Int. Cl.
*G09G 3/00* (2006.01)
*G09G 5/14* (2006.01)
(Continued)

(52) U.S. Cl.
CPC ........... *G09G 3/006* (2013.01); *G06F 3/1431* (2013.01); *G06F 3/1446* (2013.01); *G09G 5/14* (2013.01); *G09G 3/3611* (2013.01); *G09G 2300/026* (2013.01); *G09G 2300/0413* (2013.01); *G09G 2310/08* (2013.01); *G09G 2320/0606* (2013.01); *G09G 2320/08* (2013.01); *G09G 2340/0407* (2013.01); *G09G 2340/0464* (2013.01); *G09G 2340/14* (2013.01); *G09G 2354/00* (2013.01); (Continued)

(58) Field of Classification Search
CPC ...... G09G 3/006; G09G 5/14; G09G 2354/00; G09G 2340/14; G09G 2356/00; G09G 2340/0407; G09G 2320/08; G09G 2320/0606; G09G 3/3611; G09G 2340/0464; G09G 2300/0413; G09G 2300/026; G09G 2360/04; G09G 2310/08; G06F 3/1446; G06F 3/1431
See application file for complete search history.

(56) References Cited

U.S. PATENT DOCUMENTS 6,046,709 A * 4/2000 Shelton ................. G06F 3/1446
345/1.1
6,104,414 A * 8/2000 Odryna ..................... G06F 3/14
345/1.3
(Continued)

FOREIGN PATENT DOCUMENTS

EP          1612657 A2    1/2006

OTHER PUBLICATIONS

Wallace, et al., "DeskAlign: Automaticlly Aligning a TiledWindows Desktop", In Proceedings of IEEE International Workstop on Projector-Camera Systems, Oct. 2003, pp. 1-7.
(Continued)

*Primary Examiner* — Jose R Soto Lopez
(74) *Attorney, Agent, or Firm* — Arent Fox LLP (57) ABSTRACT

The present disclosure provides devices and techniques for correcting misalignment in a multi-display system by identifying a misalignment between a plurality of displays in the multi-display device and determining a line start position of at least one of the plurality of displays in response to identifying the misalignment. The techniques further include transmitting a first line start signal at the line start position of the at least one of the plurality of displays to correct the misalignment.

20 Claims, 7 Drawing Sheets

(51) Int. Cl.
*G06F 3/14* (2006.01)
*G09G 3/36* (2006.01)

(52) U.S. Cl.
CPC ..... *G09G 2356/00* (2013.01); *G09G 2360/04* (2013.01)

(56) References Cited

U.S. PATENT DOCUMENTS

| | | | |
|---|---|---|---|
| 6,333,750 B1* | 12/2001 | Odryna | G06F 3/14 345/1.1 |
| 6,411,302 B1* | 6/2002 | Chiraz | G06F 3/1431 345/531 |
| 6,597,373 B1 | 7/2003 | Singla et al. | |
| 6,628,243 B1 | 9/2003 | Lyons et al. | |
| 6,727,875 B1* | 4/2004 | Mikami | G09G 3/3648 345/92 |
| 7,791,561 B2 | 9/2010 | Najjar et al. | |
| 7,884,816 B2 | 2/2011 | Burroughs et al. | |
| 8,411,245 B2 | 4/2013 | Lee et al. | |
| 8,508,432 B2 | 8/2013 | Shim et al. | |
| 9,148,614 B2 | 9/2015 | Szolyga et al. | |
| 9,343,001 B2* | 5/2016 | Asami | G06F 3/1446 |
| 9,798,744 B2* | 10/2017 | Fagans | G06F 3/04817 |
| 9,851,776 B2* | 12/2017 | Toyotaka | G06F 1/1641 |
| 9,921,794 B2* | 3/2018 | Lee | G06F 3/1446 |
| 2002/0008675 A1* | 1/2002 | Mayer, III | G06F 3/1446 345/4 |
| 2003/0098833 A1* | 5/2003 | Sekido | G09G 3/3688 345/87 |
| 2003/0117356 A1* | 6/2003 | Moon | G02F 1/13452 345/87 |
| 2004/0222385 A1* | 11/2004 | Hatajima | G09G 3/006 250/491.1 |
| 2005/0052439 A1* | 3/2005 | Liou | G09G 3/20 345/204 |
| 2005/0253799 A1* | 11/2005 | Kamio | G09G 3/3614 345/103 |
| 2006/0164380 A1* | 7/2006 | Yang | G09G 3/3677 345/103 |
| 2010/0128019 A1* | 5/2010 | Harada | G06F 3/147 345/212 |
| 2010/0134384 A1* | 6/2010 | Kim | G06F 3/1431 345/1.3 |
| 2011/0164065 A1 | 7/2011 | Mate et al. | |
| 2011/0279426 A1* | 11/2011 | Imamura | G02F 1/13336 345/207 |
| 2012/0075334 A1* | 3/2012 | Pourbigharaz | G06F 3/1438 345/619 |
| 2012/0262627 A1* | 10/2012 | Cho | G09G 5/006 348/540 |
| 2012/0275087 A1 | 11/2012 | Corey et al. | |
| 2013/0222441 A1* | 8/2013 | Yokoyama | G09G 5/10 345/690 |
| 2014/0063392 A1* | 3/2014 | Gondo | G09G 3/3611 349/41 |
| 2014/0168198 A1* | 6/2014 | Tan | G09G 3/3611 345/213 |
| 2014/0176407 A1* | 6/2014 | Choi | G09G 3/3648 345/87 |
| 2014/0292744 A1* | 10/2014 | Sugimoto | G09G 3/20 345/213 |
| 2014/0292817 A1 | 10/2014 | Iversen et al. | |
| 2014/0306966 A1* | 10/2014 | Kuo | G09G 5/12 345/502 |
| 2015/0193188 A1 | 7/2015 | Noguchi | |
| 2015/0235603 A1* | 8/2015 | Li | G09G 3/3677 345/214 |
| 2015/0294614 A1* | 10/2015 | Duan | G09G 3/2092 345/214 |
| 2015/0302816 A1* | 10/2015 | Won | G09G 3/3685 345/87 |
| 2016/0049127 A1* | 2/2016 | Park | G09G 3/3688 345/213 |
| 2016/0111051 A1* | 4/2016 | Jeon | G09G 3/3674 345/204 |
| 2016/0180812 A1* | 6/2016 | Choi | G09G 5/12 345/204 |
| 2016/0189646 A1* | 6/2016 | Hong | G09G 3/3611 345/100 |
| 2016/0189653 A1* | 6/2016 | Kim | G09G 3/3677 345/212 |
| 2016/0232831 A1* | 8/2016 | Nakanishi | G09G 3/3677 |
| 2016/0283084 A1 | 9/2016 | Keysers et al. | |
| 2016/0343108 A1 | 11/2016 | Oo et al. | |
| 2016/0372025 A1* | 12/2016 | Ahn | G09G 3/3614 |
| 2017/0052635 A1* | 2/2017 | Yu | G06F 3/044 |
| 2017/0287426 A1* | 10/2017 | Chang | G09G 3/3677 |
| 2018/0033381 A1* | 2/2018 | Hwang | G09G 3/3607 |
| 2018/0190226 A1* | 7/2018 | Wang | G09G 3/3674 |

OTHER PUBLICATIONS

"International Search Report & Written Opinion Issued in PCT Application No. PCT/US2018/016531", dated May 4, 2018, 12 Pages.

* cited by examiner

MULTI-DISPLAY SYSTEM

FIELD OF THE INVENTION

The present disclosure relates to graphic display systems, and more particularly to a system and method for correcting misalignments in a multi-display system.

BACKGROUND

As computer systems have increased in power and capacity that allow for multiple applications to run concurrently, it has become commonplace for computer systems to include more than one display device or monitor. Systems with multiple displays (or "multi-display systems"), however, are not limited to traditional desktop systems. Instead, multi-display systems can be implemented in a variety of systems, including notebook or table computers, hand-held personal digital assistants (PDAs), multiscreen television systems, etc. Even further, many multi-display systems are implemented without being connected to a computer system.

Conventional multi-display systems, however, lack techniques to effectively manage misalignment that may occur across multiple displays. For example, in some instances, physical alignment of displays may impact the display of information across multiple monitors. Additionally, multiple monitors attached to a system may not be identical. For example, each monitor in a multi-display system may have different physical dimensions such as screen resolution and screen size. The typical approach to correct such misalignments includes attempting to conceptualize multiple monitors as a single, contiguous display surface. Thus, to the conventional systems or applications that output information to be rendered on the multiple monitors, the multi-display system appears as a single display. However, this approach fails to recognize and compensate for the differences and conditions that may exist among the multiple displays attached to a computer system.

SUMMARY

Techniques of the present disclosure correct misalignment in a multi-display system by identifying the misalignment between a plurality of displays and determining a line start position of at least one of the plurality of displays to correct the misalignment. Accordingly, the techniques may include adjusting the line start position by transmitting a first line start signal at a modified line start position determined to correct the misalignment between a plurality of displays.

In one example, a method for correcting misalignment in a multi-display system is disclosed. The method may include identifying a misalignment between a plurality of displays in the multi-display device and determining a line start position of at least one of the plurality of displays in response to identifying the misalignment. The method may further include transmitting a first line start signal at the line start position of the at least one of the plurality of displays to correct the misalignment.

In another example, a multi-display system for correcting misalignment is disclosed. The system may include a processor and a memory coupled to the processor. The memory may include instructions executable by the processor to identify a misalignment between a plurality of displays in the multi-display device and determine a line start position of at least one of the plurality of displays in response to identifying the misalignment. The system may further include instructions executable by the processor to transmit a first line start signal at the line start position of the at least one of the plurality of displays to correct the misalignment.

In further example, a computer-readable medium for correcting misalignment in a multi-display system is disclosed. The instructions may be for identifying a misalignment between a plurality of displays in the multi-display device and determining a line start position of at least one of the plurality of displays in response to identifying the misalignment. The computer-readable medium may further include instructions for transmitting a first line start signal at the line start position of the at least one of the plurality of displays to correct the misalignment.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

As discussed above, conventional multi-display systems lack techniques to effectively manage misalignment that may occur across multiple displays. Techniques of the present disclosure correct misalignment in a multi-display device by identifying the misalignment between a plurality of displays and correcting the misalignment by adjusting a line start position to drive an image signal at a modified gate line for at least one of the plurality of displays.

Various aspects are now described in more detail with reference to the FIGS. 1A-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

Figure 1A:
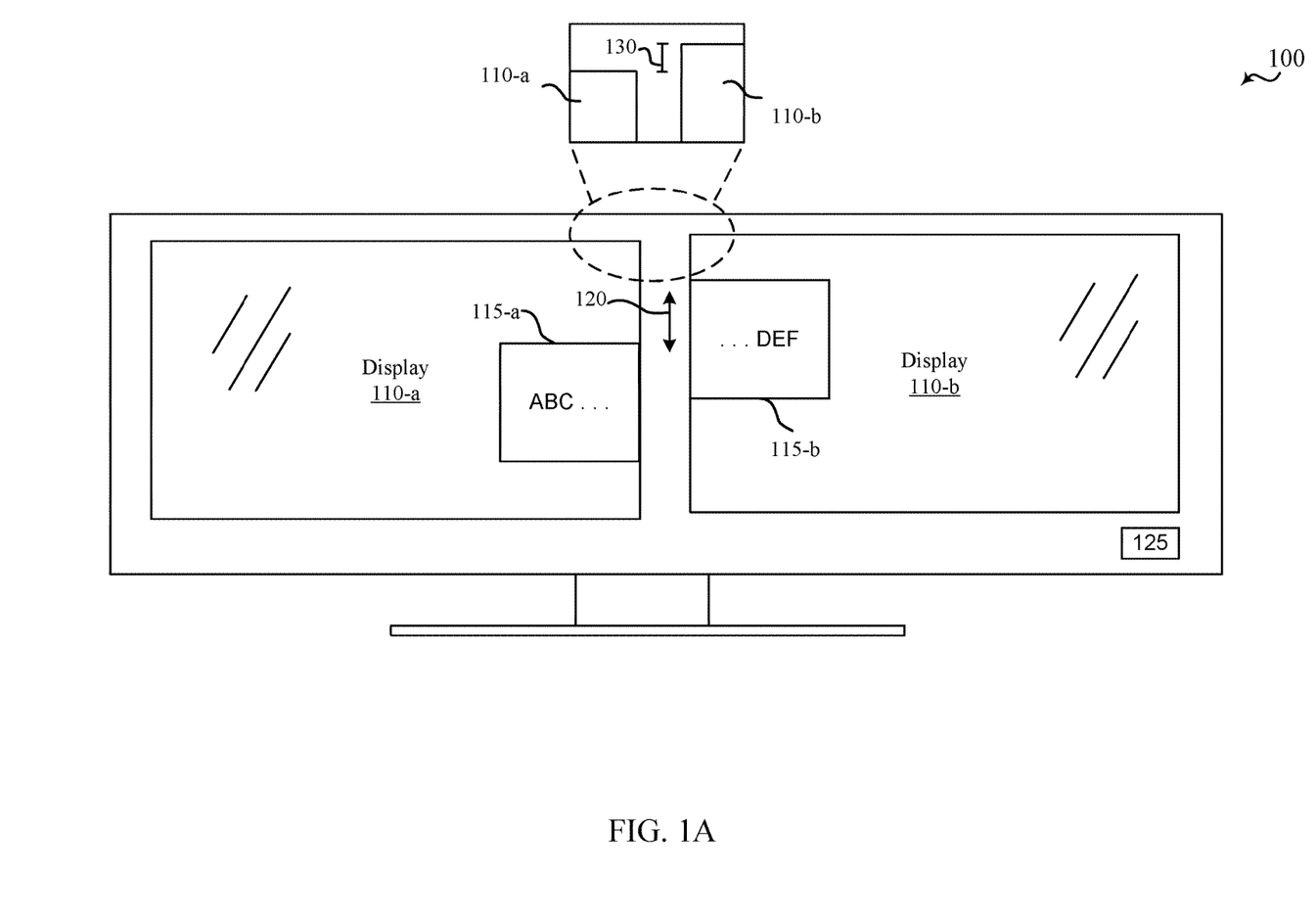
FIGS. 1A-1D are schematic diagrams of examples of multi-display systems in which features of the present disclosure may operate.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples Referring first to FIGS. 1A-1D, a multi-display system 100 is shown that includes a plurality of displays 110 integrated thereto. In the example of FIG. 1A, the multi-display system 100 is shown with two adjacent displays 110. In some examples, the displays 110 may be referred to as the liquid crystal panel of the display 110. Although FIG. 1A illustrates a multi-display system 100 having only two displays 110 (e.g., first display 110-a and second display 110-b), it should be understood by those skilled in the art that any configuration and number of displays 110 may be included as part of a multi-display system 100.

Features of the present disclosure provide techniques for correcting any misalignment of displayed information 115 that may occur between a plurality of displays 110. For example, information 115 that may be rendered across the multiple displays 110 may include a misalignment 120 where a first rendered information 115-a on the first display 110-a and a second rendered information 115-b on the second display 110-b may not align in a single continuous image. Thus, although the information 115 would ideally be in one continuous line, in some examples there may be misalignment 120 that may break the straight line display. Thus, the term "misalignment" may refer to mechanical or manufacturing tolerance issues that may arise during the manufacturing of the multi-display system 100. For example, during the manufacturing or integration of the multi-display system 100, one or more displays 110 may fail to physically align on the same plane (e.g., there may be physical offset 130 between the first display 110-a and the second display 110-b). As such, the rows of pixels in two adjacent displays may also be offset from each other such that the information 115 displayed across the first display 110-a and the second display 110-b is misaligned 120. In one example, the pixel misalignment 120 may correspond equally to the physical offset 130 (e.g., in 1:1 ratio). However, in another example, the pixel misalignment 120 may be larger or smaller than the physical offset 130 between the two displays 110.

One technique provided herein to correct the misalignment 120 may include adjusting a line start position of at least one of the plurality of displays 110 (e.g., first display 110-a or second display 110-b) and transmitting a line start signal (e.g., driving an initial image signal) at the determined line start position. Thus, as in the illustrated example of FIG. 1B, the misalignment 120 may be corrected by vertically shifting 122 the second rendered information 115-b down such that both the first rendered image or information 115-a and the second rendered image or information 115-b are graphically aligned across the multiple displays 110. One way of shifting 122 the display image down may include inserting dummy pixels at the top of the second display 110-b such that the rendered image starts lower than the original output. Such adjustments may be controlled by a display manager 125 that may include a controller for each display 110 for correcting the misalignments 120 between a plurality of displays 110.

In some examples, the display manager 125 may include a flag or register in its memory (not shown) that identifies whether there is a misalignment 120 across multiple displays 110. The identification of the misalignment 120 may be either observed by a user and signaled to the display manager 125 or automatically detected by the multi-display system 100. The display manager 125 may further identify the extent of the misalignment 120 in order to determine the line start position that may be required to correct the misalignment 120. Thus, the display manager 125 may adjust or compensate for misalignment of displayed information between the first display 110-a and the second display 110-b. In some examples, the display manager 125 may be implemented with a timing controller (TCON) (see FIG. 2).

Figure 1B:
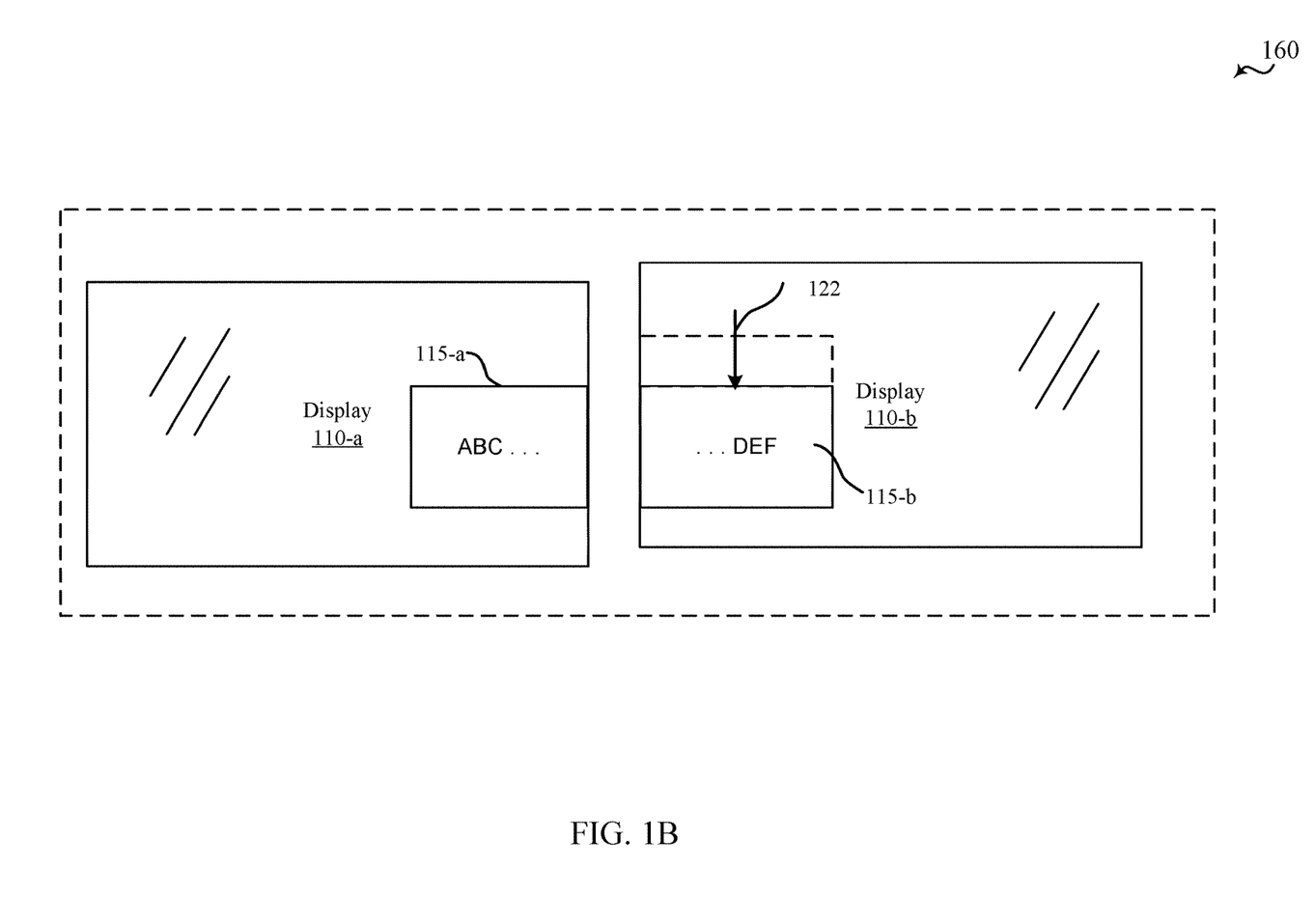
Figure 1C:
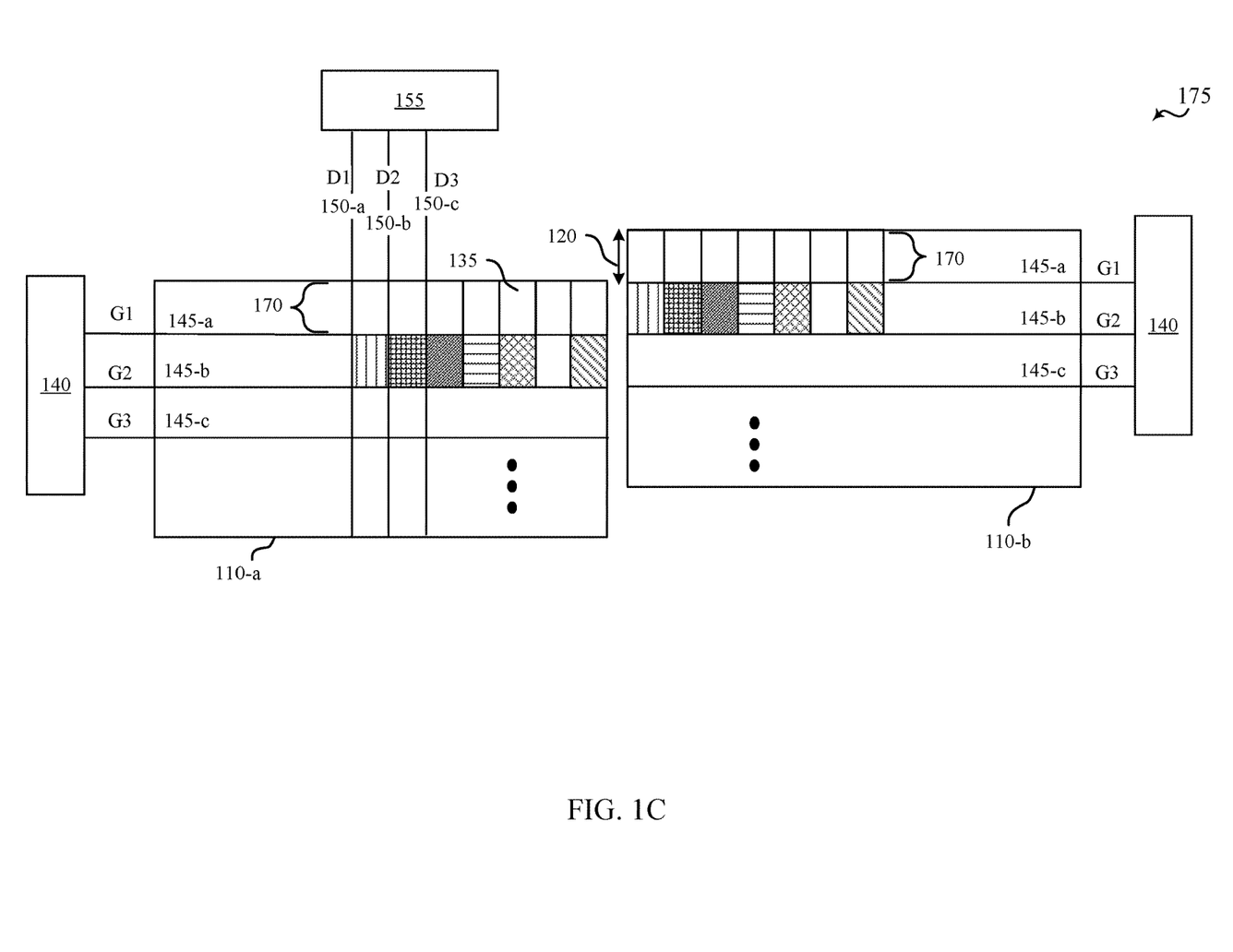

FIG. 1C illustrates a diagram 175 that shows a portion of the multi-display system 100 in FIGS. 1A and 1B in which the misalignment 120 of rendered information across multiple displays 110 is being corrected at the pixel level. As discussed above, a misalignment 120 of rendered image or information across a plurality of displays 110 may occur during the manufacturing of the multi-display system 100. As such, the first row of pixels 170 (e.g., top row of pixels) of the first display 110-a may fail to match with the first row of pixels 170 of the second display 110-b. Thus, as illustrated in FIG. 1B, a vertical misalignment 120 between a plurality of displays 110 may occur when the pixel data across gate lines 145 of the first display 110-a fails to align with the pixel data across the gate lines 145 of the second display 110-b. Although FIG. 1C illustrates an offset of one row of pixels, it should be understood that the offset may be any amount (e.g., one row, two rows, three rows of pixels). In order to correct the misalignment 120, aspects of the present disclosure shift the start of the rows of the higher placed display (e.g., second display 110-b) such that the pixel rows align with the start of pixel rows of the lower placed display (e.g., first display 110-a).

In one or more displays 110, pixel 135 may be connected to gate lines 145 and data lines 150 that may be arranged in an active matrix pattern (e.g., horizontally and vertically across the display 110). Thus, in some examples, each display 110 may be arranged with a plurality of gate lines 145 (e.g., G1, G2, G3) running horizontally across the display 110 and a plurality of data lines 150 (e.g., D1, D2, D3) running vertically across the display 110. The plurality of gate lines 145 may be connected to a plurality of gates (see FIG. 2) of a gate driving component 140. The plurality of data lines 150 may be connected to a data driving component 155.

Figure 2:
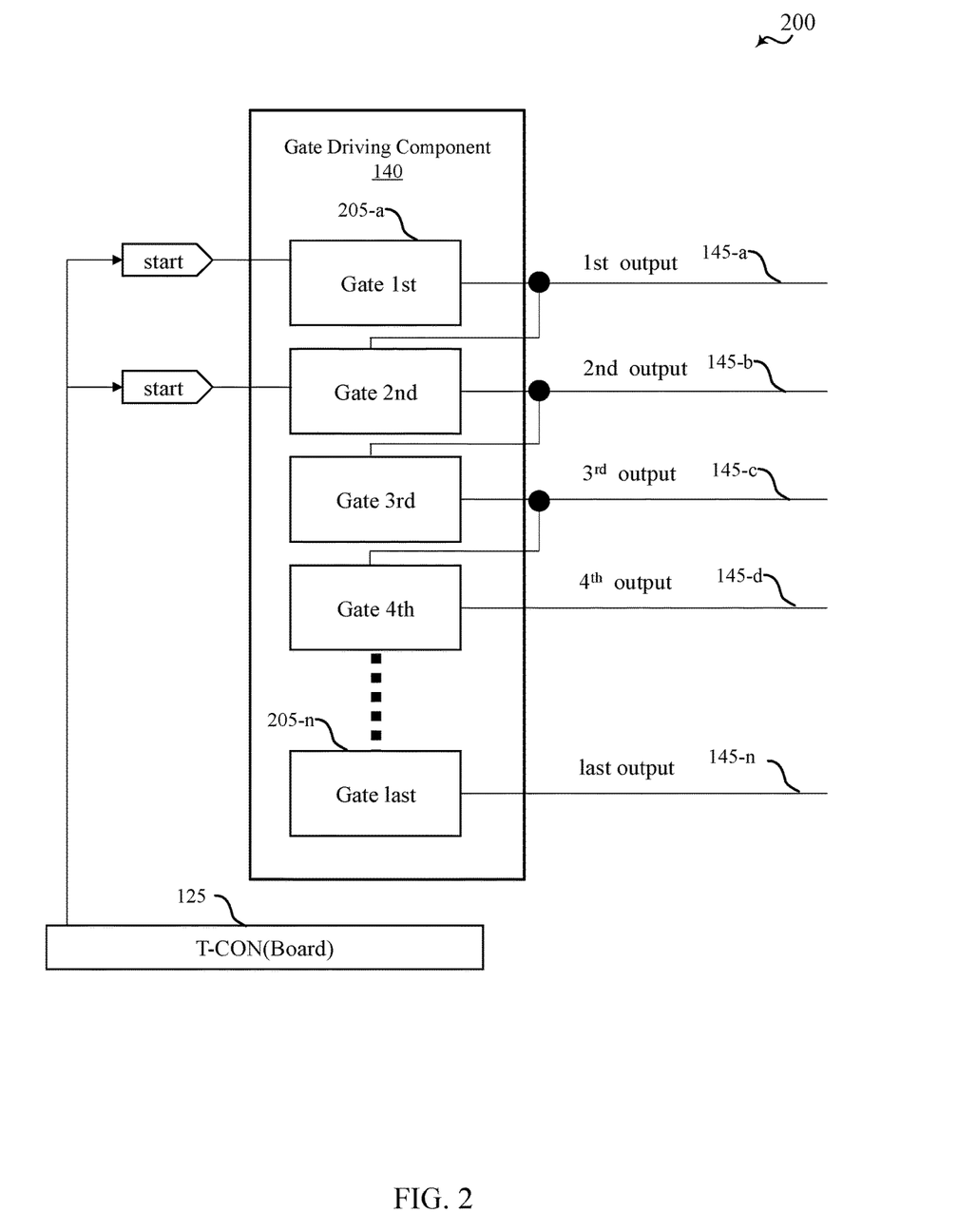
FIG. 2 is an example of a gate driving component that includes a plurality of gate lines electronically connected to the pixel parts of the display device in accordance with aspects of the present disclosure.

In some examples, a timing controller (e.g., display manager 125 or TCON) as shown in FIGS. 1A and 2 may map data of an input image to a plurality of gate lines 145 and data lines 150 by transmitting pixel data across the lines. Accordingly, a pixel array may comprise the liquid crystal cells, Clc, formed at crossings of the data lines 150 and the gate lines 145. Each pixel data in a pixel 135 may comprise red subpixel data (R), green subpixel data (G), and blue subpixel data (B). In some aspects, the liquid crystal cells in the pixel array may share the same data lines 150, and are continually charged with data voltages supplied in a time-division manner through the data lines 150.

Figure 1D:
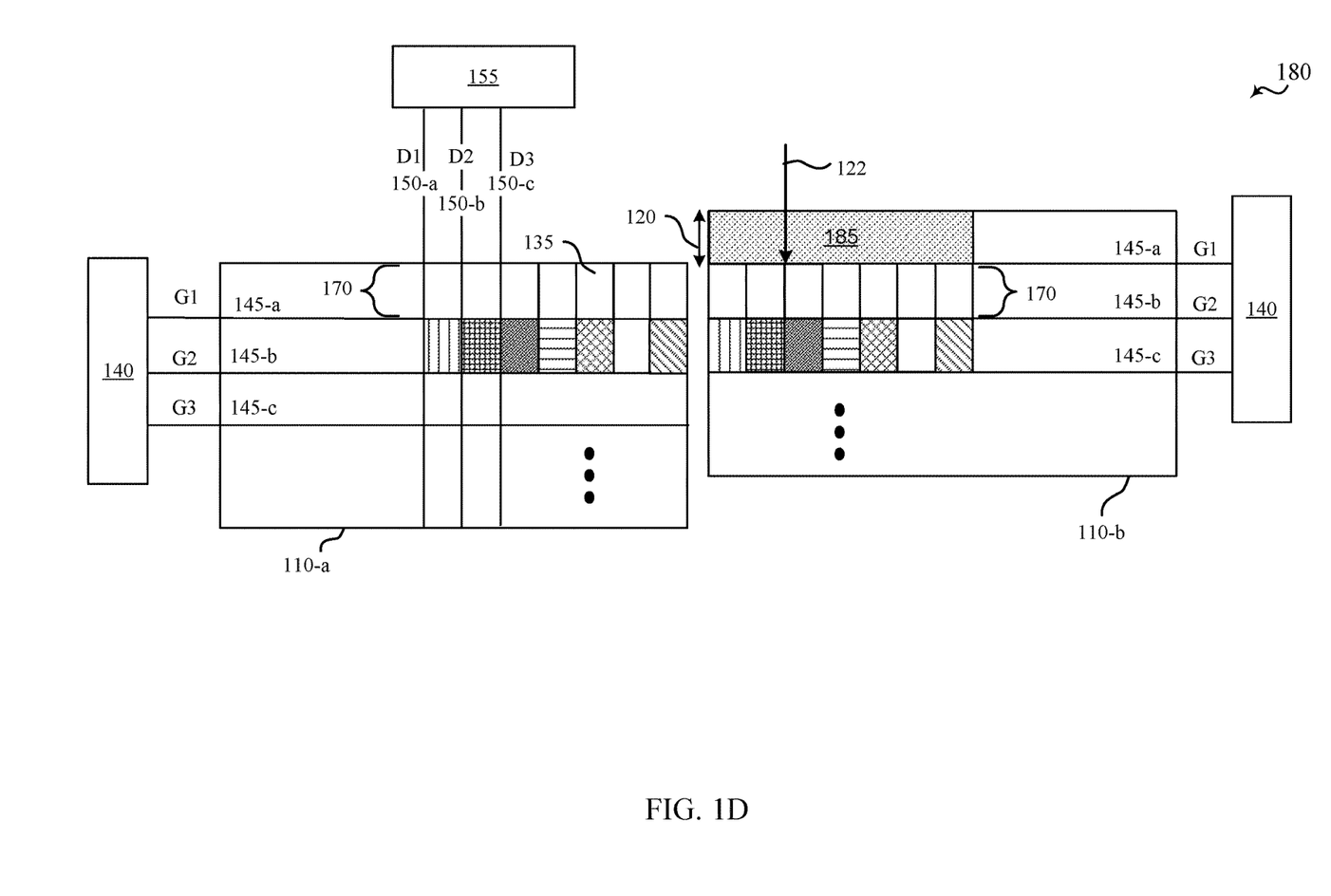

Aspects of the present disclosure may correct a misalignment 120 across multiple displays 110 by shifting 122 the start position of the one or more gate lines 145 for at least one of the plurality of displays 110. With reference to FIG. 1D, the misalignment 120 may be corrected by inserting dummy pixels 185 across the first gate line 145-a of the second display 110-b in order to shift the image down such that the line start signal (e.g., initial image signal) for the second display 110-*b* may be driven across the second gate line 145-*b*. As such, the first row of pixels 170 for the second display 110-*b* may correspond with the first row of pixels 170 for the first display 110-*a*. Accordingly, image or information rendered across the two display 110-*b* may be corrected and aligned properly.

FIG. 2 is an example of a gate driving component 140 that includes a plurality of gate lines 145 connected to a plurality of gates 205 in accordance with aspects of the present disclosure. Thus, a first gate 205-*a* may output a first signal ("$1^{st}$ output") on the first gate line 145-*a*, a second gate 205-*b* may output a second signal ("$2^{nd}$ output") on the second gate line 145-*b*, etc. As discussed above, each pixel may be electrically connected to one of a plurality of gate lines 145 and one of a plurality of data lines 150. In some examples, the gate driving component 140 may also be referred to as a "gate driving circuit." The gate driving component 140 may output an image signal obtained by adding a voltage to a normal image signal.

In some examples, techniques of the present disclosure correct misalignment in a multi-display device by identifying the misalignment between the plurality of display devices and correcting the misalignment by determining a first line start position for at least one of the plurality of display screens. Identifying the misalignment may include determining the extent of the misalignment. Thus, based on the identifying, the display manager 125 (or "TCON") may determine which gate 205 to initiate the output of the first line start signal (first image signal).

For example, if the display manager 125 determines that the misalignment may be corrected by transmitting the line start signal at the second gate line 145-*b*, the display manager 125 may insert dummy (or "null") pixels 185 at the first gate line 145-*b* in order to account for any misalignment. Similarly, if the display manager 125 determines that the line start signal should be initiated at the third gate line 145-*c* in order to correct the misalignment based on the magnitude of the misalignment (e.g., if the shift or offset between plurality of displays 110 is significant), the display manager 125 may input dummy pixel 185 data across the first gate 205-*b* and the second gate 205-*c* such that the line start signal is outputted first across the third gate 205-*c* onto the third gate line 145-*c*.

Figure 3:
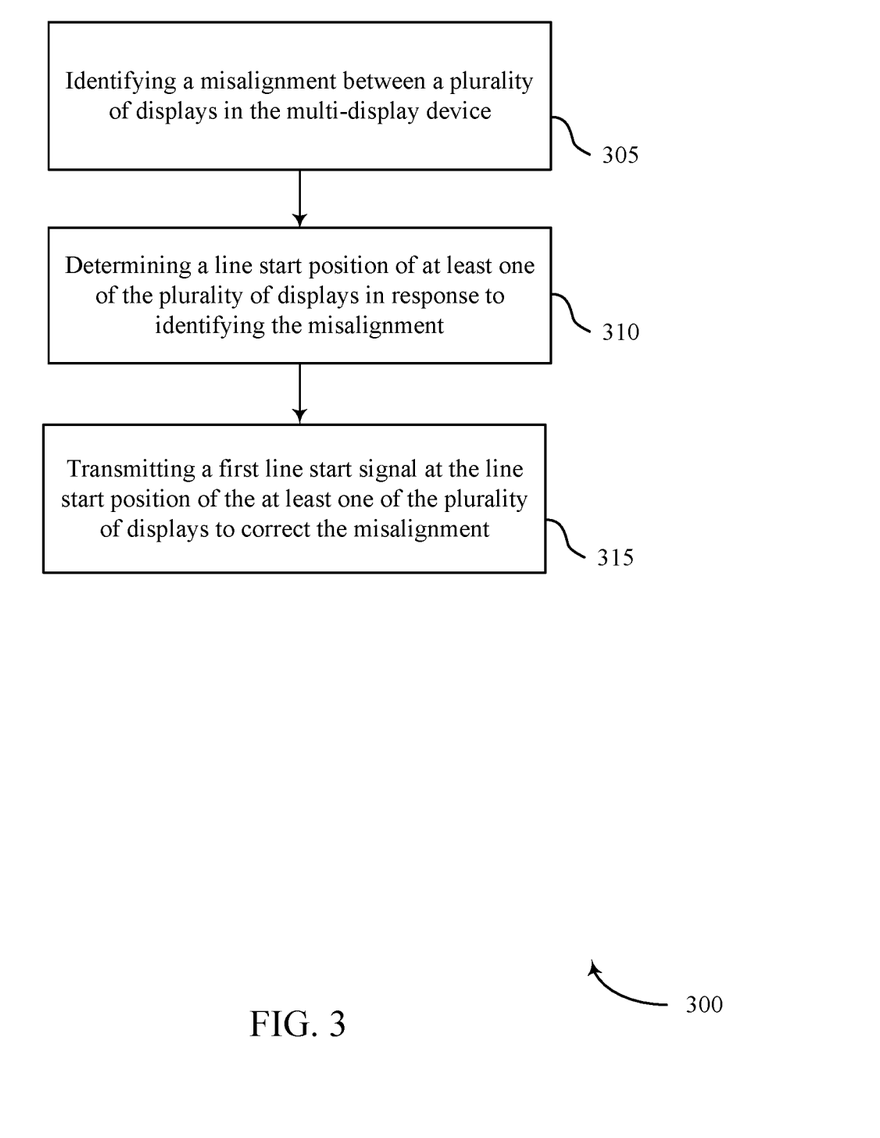
FIG. 3. is a flow chart of a method implemented on the display device in accordance with various aspects of the present disclosure.

Referring to FIG. 3, an example method 300 for controlling correcting misalignments in a multi-display device is described. The method 300 may be performed by the display manager 125 as described with reference to FIGS. 1A and 4. Although the method 300 is described below with respect to the elements of the multi-display system 100, other components may be used to implement one or more of the steps described herein. In some examples, a TCON integrated in the multi-display device may control the correction of the misalignments that may be observed between multiple devices.

At block 305, the method 300 may include identifying a misalignment between a plurality of displays in the multi-display device. In some examples, the misalignment may be identified manually by a user (e.g., visual determination) or automatically by the display manager 125. An example of automatically identifying a misalignment may include the display manager 125 utilizing image data captured by an image processing device (e.g., camera) to identify the misalignment between the plurality of displays. The display manager 125 may also store information associated with the magnitude (or extent) of the misalignment between the multiple displays 110. The magnitude information may inform the display manager 125 the amount of adjustment that may be required to correct any misalignment. Thus, in some examples, identifying the misalignment may further include identifying a size of the misalignment for displayed information across a first display of the plurality of displays and a second display of the plurality of displays. Aspects of block 305 may be performed by misalignment detection component 430 described with reference to FIG. 4.

At block 310, the method 300 may include determining a line start position of at least one of the plurality of displays in response to identifying the misalignment. In some examples, determining the line start position may be based on magnitude information stored in the register or memory of the display manager 125 that identifies a size of the misalignment for displayed information across a first display of the plurality of displays and a second display of the plurality of displays. Accordingly, the display manager 125 may select a number of rows to shift the initial image signal down in order to correct the misalignment. Aspects of block 310 may be performed by the graphic control manager 435 described with reference to FIG. 4.

At block 315, the method 300 may include transmitting a first line start signal at the line start position of the at least one of the plurality of displays to correct the misalignment. In some examples, transmitting the line start signal may include selecting a start gate line from a plurality of gate lines of a first display based on the line start position and driving an image signal initiated through the selected start gate. For example, the techniques of the present disclosure may drive a first image signal that would otherwise be transmitted on the first gate line 145-*a* instead through the second gate 205-*b* and the second gate line 145-*b*. In doing so, the display manager 125 may insert dummy pixel data across the first gate 205-*a* and the first gate line 145-*a*. Similarly, if additional correction is required, the display driver 125 may insert dummy pixel data across the first gate 205-*a* and the second gate 205-*b*, while driving the initial image signal through the third gate 205-*c* and the third gate line 205-*c*. It should be understood by those skilled in the art that the shift to correct vertical misalignment may include transmitting the line start signal across any gate 205 of the gate driving component 140. Thus, in some examples, transmitting the first line start signal may include inserting a dummy image signal through a first gate line of a plurality of gate lines of at least one display of the plurality of displays and driving an initial image signal through a second gate line of a plurality of gate lines of at least one display of the plurality of displays. Aspects of block 315 may be performed by the gate driving component 140 describe with reference to FIGS. 2 and 4.

Figure 4:
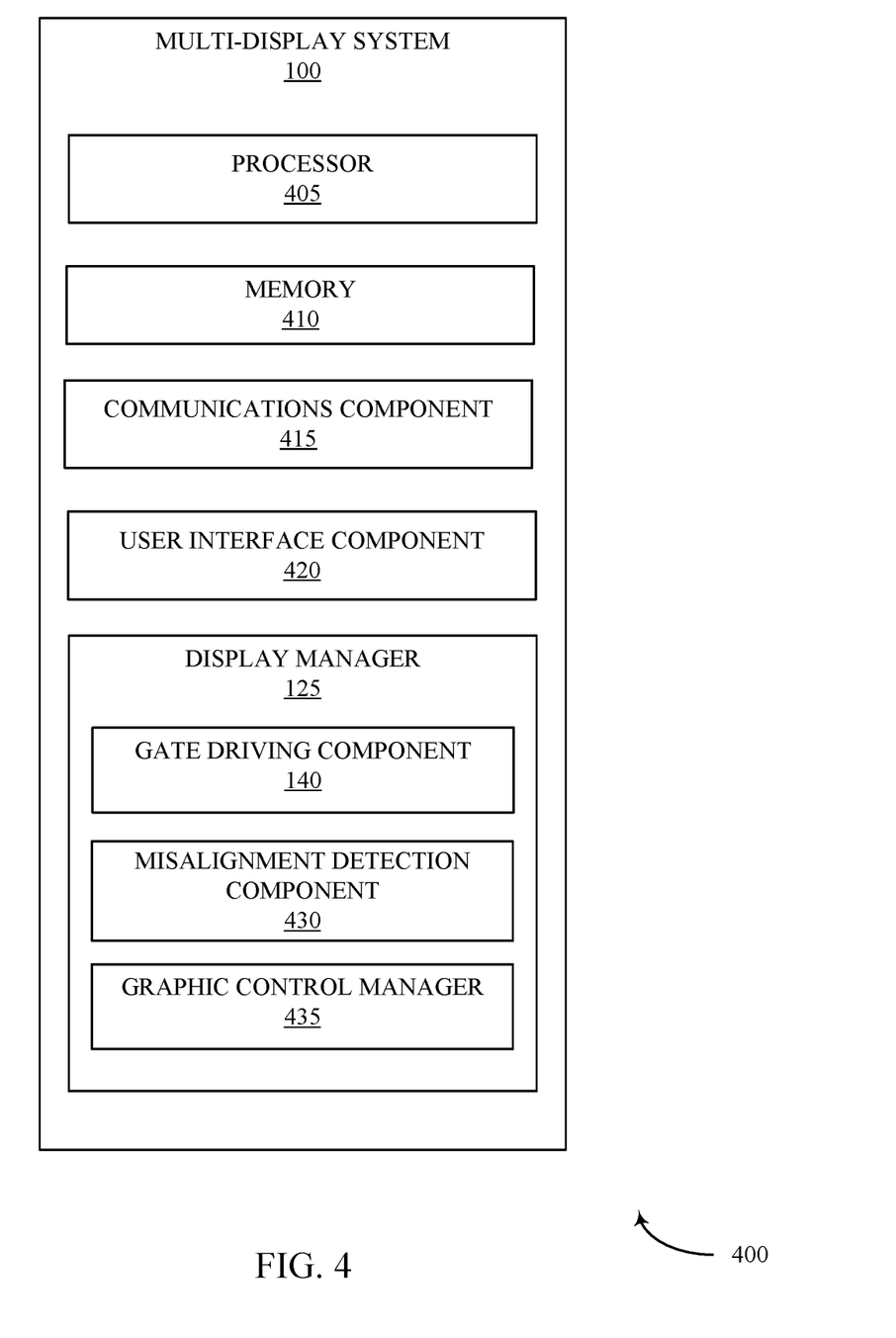
FIG. 4 is a diagram illustrating an example of a hardware implementation for a display device in accordance with various aspects of the present disclosure.

Referring now to FIG. 4, a diagram 400 illustrating an example of a hardware implementation for a multi-display system 100 in accordance with various aspects of the present disclosure is described. In some examples the multi-display system 100 may be a foldable system such that the multi-display system in a first position is folded and in a second position is unfolded with the plurality of displays arranged such that a first display of the plurality of displays is positioned adjacent to a second display of the plurality of displays. In some examples, the multi-display system 100 may include a processor 405 for carrying out one or more processing functions (e.g., method 300) described herein. The processor 405 may include a single or multiple set of processors or multi-core processors. Moreover, the processor 405 can be implemented as an integrated processing system and/or a distributed processing system.

The multi-display system 100 may further include memory 410, such as for storing local versions of applications being executed by the processor 405. In some aspects, the memory 410 may be implemented as a single memory or partitioned memory. In some examples, the operations of the memory 410 may be managed by the processor 405. Memory 410 can include a type of memory usable by a computer, such as random access memory (RAM), read only memory (ROM), tapes, magnetic discs, optical discs, volatile memory, non-volatile memory, and any combination thereof. Additionally, the processor 405, and memory 410 may include and execute operating system (not shown).

Further, multi-display system 100 may include a communications component 415 that provides for establishing and maintaining communications with one or more parties utilizing hardware, software, and services as described herein. Communications component 415 may carry communications between components on displays 110 or the multi-display system 100, as well as between multi-display system 100 and external devices, such as to electronic devices coupled locally to the multi-display system 100 and/or located across a communications network and/or devices serially or locally connected to multi-display system 100. For example, communications component 415 may include one or more buses operable for interfacing with external devices.

The multi-display system 100 may also include a user interface component 420 operable to receive inputs from a user of multi-display system 100 and further operable to generate outputs for presentation to the user. User interface component 420 may include one or more input devices, including but not limited to a touch-sensitive display, a navigation key, a function key, a microphone, a voice recognition component, any other mechanism capable of receiving an input from a user, or any combination thereof. Further, user interface component 420 may include one or more output devices, including but not limited to a display, a speaker, any other mechanism capable of presenting an output to a user, or any combination thereof.

The multi-display system 100 may also include display manager 125 for correcting misalignment between a plurality of displays 110. In some examples, the display manager 125 may include gate driving component 140 for outputting dummy pixels in one or more gate lines in order to correct the misalignment. The misalignment may be detected by the misalignment detection component 430, while the graphic control manager 435 identifies the line start signal.

As discussed above, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device (e.g., multi-display system 100), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. In contract, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A method for correcting a mechanical misalignment in a multi-display system, comprising:
    identifying a mechanical misalignment between a plurality of displays in the multi-display system;
    determining a line start position of at least one of the plurality of displays in response to identifying the mechanical misalignment; and
    transmitting a first line start signal to a gate line corresponding to the line start position of the at least one of the plurality of displays to correct the mechanical misalignment.

2. The method of claim 1, wherein identifying the mechanical misalignment between the plurality of displays in the multi-display system comprises:
    identifying a size of the mechanical misalignment for displayed information across a first display of the plurality of displays and a second display of the plurality of displays.

3. The method of claim 1, wherein transmitting the first line start signal to the gate line corresponding to the line start position comprises:
    selecting a start gate line from a plurality of gate lines of a first display based on the line start position; and
    driving an image signal initiated through the selected start gate.

4. The method of claim 1, wherein transmitting the first line start signal to the gate line corresponding to the line start position comprises:
    inserting a dummy image signal through a first gate line of a plurality of gate lines of at least one display of the plurality of displays; and
    driving an initial image signal through a second gate line of the plurality of gate lines of the at least one display of the plurality of displays.

5. The method of claim 1, further comprising:
    controlling, by a timing controller (TCON) integrated with the multi-display system, one or more of the identifying of the mechanical misalignment, the determining of the line start position, or the transmitting of the first line start signal.

6. The method of claim 1, wherein the multi-display system in a first position is folded and in a second position is unfolded with the plurality of displays arranged such that a first display of the plurality of displays is positioned adjacent to a second display of the plurality of displays.

7. The method of claim 1, wherein the mechanical misalignment is identified either manually by a user or automatically by a display manager.

8. A multi-display system for correcting a mechanical misalignment comprising:
    a processor;
    a memory coupled to the processor, wherein the memory includes instructions executable by the processor to:
        identify a mechanical misalignment between a plurality of displays in the multi-display system;
        determine a line start position of at least one of the plurality of displays in response to identifying the mechanical misalignment; and transmit a first line start signal to a gate line corresponding to the line start position of the at least one of the plurality of displays to correct the mechanical misalignment.

9. The multi-display system of claim 8, wherein the instructions to identify the mechanical misalignment between the plurality of displays in the multi-display system are further executable by the processor to:
identify a size of the mechanical misalignment for displayed information across a first display of the plurality of displays and a second display of the plurality of displays.

10. The multi-display system of claim 8, wherein the instructions to transmit the first line start signal to the gate line corresponding to the line start position are further executable by the processor to:
select a start gate line from a plurality of gate lines of a first display based on the line start position; and
drive an image signal initiated through the selected start gate.

11. The multi-display system of claim 8, wherein the instructions to transmit the first line start signal to the gate line corresponding to the line start position are further executable by the processor to:
insert a dummy image signal through a first gate line of a plurality of gate lines of at least one display of the plurality of displays; and
drive an initial image signal through a second gate line of the plurality of gate lines of the at least one display of the plurality of displays.

12. The multi-display system of claim 8, wherein the multi-display system in a first position is folded and in a second position is unfolded with the plurality of displays arranged such that a first display of the plurality of displays is positioned adjacent to a second display of the plurality of displays.

13. The multi-display system of claim 1, wherein the mechanical misalignment is identified either manually by a user or automatically by a display manager associated with the processor.

14. A non-transitory computer-readable medium for correcting a mechanical misalignment in a multi-display system comprising instructions for:
identifying a mechanical misalignment between a plurality of displays in the multi-display system;
determining a line start position of at least one of the plurality of displays in response to identifying the mechanical misalignment; and
transmitting a first line start signal to a gate line corresponding to the line start position of the at least one of the plurality of displays to correct the mechanical misalignment.

15. The non-transitory computer-readable medium of claim 14, wherein the instructions for identifying the mechanical misalignment between the plurality of displays in the multi-display system further include instructions for:
identifying a size of the mechanical misalignment for displayed information across a first display of the plurality of displays and a second display of the plurality of displays.

16. The non-transitory computer-readable medium of claim 14, wherein the instructions for transmitting the first line start signal to the gate line corresponding to the line start position further include instructions for:
selecting a start gate line from a plurality of gate lines of a first display based on the line start position; and
driving an image signal initiated through the selected start gate.

17. The non-transitory computer-readable medium of claim 14, wherein the instructions for transmitting the first line start signal to the gate line corresponding to the line start position further include instructions for:
inserting a dummy image signal through a first gate line of a plurality of gate lines of at least one display of the plurality of displays; and
driving an initial image signal through a second gate line of the plurality of gate lines of the at least one display of the plurality of displays.

18. The non-transitory computer-readable medium of claim 14, further comprising instructions for:
controlling, by a timing controller (TCON) integrated with the multi-display system, one or more of the identifying of the mechanical misalignment, the determining of the line start position, or the transmitting of the first line start signal.

19. The non-transitory computer-readable medium of claim 14, wherein the multi-display system in a first position is folded and in a second position is unfolded with the plurality of displays arranged such that a first display of the plurality of displays is positioned adjacent to a second display of the plurality of displays.

20. The computer-readable medium of claim 14, wherein the mechanical misalignment is identified either manually by a user or automatically by a display manager.

* * * * *